(12) United States Patent
Floch

(10) Patent No.: US 11,125,409 B2
(45) Date of Patent: Sep. 21, 2021

(54) IMAGE TILT CORRECTION SYSTEM OF AUTOMOTIVE BEAM PATTERN

(71) Applicant: Valeo North America, Inc., Troy, MI (US)

(72) Inventor: Lionel Floch, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/716,220

(22) Filed: Dec. 16, 2019

(65) Prior Publication Data

US 2021/0180762 A1 Jun. 17, 2021

(51) Int. Cl.
  *F21S 41/20* (2018.01)
  *F21V 5/00* (2018.01)
  *F21S 41/30* (2018.01)
  *F21S 41/24* (2018.01)

(52) U.S. Cl.
  CPC ............ *F21S 41/285* (2018.01); *F21V 5/007* (2013.01); *F21S 41/24* (2018.01); *F21S 41/30* (2018.01)

(58) Field of Classification Search
  CPC .................................................... F21S 41/265
  See application file for complete search history.

(56) References Cited

U.S. PATENT DOCUMENTS

| | | | |
|---|---|---|---|
| 3,866,081 A | 2/1975 | Hasker | |
| 10,174,901 B2* | 1/2019 | Ohno | F21S 41/663 |
| 2008/0259630 A1 | 10/2008 | Chinniah et al. | |
| 2012/0195040 A1 | 8/2012 | Treanton | |
| 2019/0162382 A1* | 5/2019 | Kang, II | F21S 43/14 |

* cited by examiner

*Primary Examiner* — Matthew J. Peerce
(74) *Attorney, Agent, or Firm* — Valeo North America, Inc.

(57) ABSTRACT

The present invention pertains to a lens arrangement system used in automobile optical modules and more particularly pertains to an image tilt correction system of automotive optical module beam patterns. A system arrangement that includes a generated light beam for illumination and a reflector for directing the light beam from a light source directed towards the outside of the optical module. Additionally provided is a lens that distributes the light beam from the reflector and where lens features include a light input side and a light output side where lens sides include a plurality of light distribution facets or lens optic patterns that are arranged to effectively produce a corrective light beam that is symmetrical and centered.

9 Claims, 6 Drawing Sheets

IMAGE TILT CORRECTION SYSTEM OF AUTOMOTIVE BEAM PATTERN

FIELD OF THE INVENTION

The present invention relates to an optical lighting module of an automobile, and more particularly, to image correction of automotive beam patterns resulting from an automotive optical module.

BACKGROUND

Optical modules are used in automobiles and the like for lighting paths ahead. These optical modules need to be oriented properly to provide adequate lighting for automobile drivers under various driving conditions.

Currently, optical modules are available to provide multiple functional operations inclusive of signaling indicator functions and producing various light-beam image patterns. Optical modules are provided with at least one light source for generating a light beam where generated light or the light-beam is directed towards the module's outside by means of reflectors or light guides. Additionally, optical modules typically have an inner and outer lens, which may be provided with optical pattern(s) for light distribution. An optical pattern on the lens may also provide or create visual aesthetics from the optical module. In some cases, the optical patterns are designed in a way that does not align with the optical axis of the light beam. Due to this possible outcome, a final beam output pattern may become tilted, skewed or shifted in orientation, which may not qualify specifications or meet regulatory light beam output requirements. Thus among various objectives that the subject invention addresses is an objective or a need to provide a corrective or enhancement system which can counter such resulting irregularities in beam output. Also, there is a need to provide a system which can counter the irregularity in the beam output. Also, an objective to apply an improved photometry arrangement. Another objective is to enhance light distribution spread to meet regulatory or industry standard requirements. And yet another objective is to achieve various optical or lighting pattern effects towards an outboard side of vehicle lamp modules.

Among the literature that can pertain to this technology include the following patent documents: U.S. Pat. No. 3,866,081 A; U.S. Publications US 2012195040 A and US 2008259630 A, all incorporated herein by reference for all purposes.

The invention herein overcomes one or more problems and shortcomings of affected optical modules and associated generally known limitations of optical modules with tilted, skewed or shifted light direction.

SUMMARY OF THE INVENTION

The present invention is directed to a unique solution that addresses at least one or more of the described issues in paragraphs above. It is believed that the present invention provides a unique design arrangement that provides capabilities for an adversely effected optical module comprising a lens to work efficiently and as mandated by providing a conforming and proper beam output. Particularly, the present invention provides corrective lens features for an optical module and other features for producing a light beam without irregularities in a generated beam pattern. It is contemplated that the system is disposed inside the optical module and tailored for such purposeful use.

Accordingly, pursuant to a first aspect of the present invention, there is contemplated an optical module for an automobile comprising a light source which generates a light beam, a provided directing medium near the light source and provided for directing the generated light beam from the light source, and provides a lens to distribute the light beam that is directed from the directing medium. The lens comprises a light incident surface and a light exit surface where each of the sides comprise a plurality of light distribution facets that may include facet feature orientations different from each other. A plurality of light distribution facets may further create a baseline reference axis when facets intersect each other to form a symmetric or mirror-image pattern with respect to such a reference axis.

It should be appreciated that the above referenced aspects and examples are non-limiting, as other aspects exist within the present invention, as shown and described herein.

DESCRIPTION OF DRAWINGS

To further provide a more encompassing description and to provide a better understanding of the invention, a set of drawings is provided. Said drawings form an integral part of the description and illustrate embodiment aspects of the invention, which should not be construed as restricting the scope of the invention, but only as examples of how the invention can be carried out. The drawings comprise the following characteristics.

FIG. 5b shows the beam pattern of the beam generated through light distribution facets of the lens of FIG. 5a.

FIG. 6b shows the resulting corrective beam pattern of the beam generated through light distribution facets of the lens of FIG. 6a.

DETAILED DESCRIPTION OF PREFERRED EMBODIMENTS

Hereinafter, embodiments of the present invention will be described with reference to accompanying drawings.

Figure 1A:
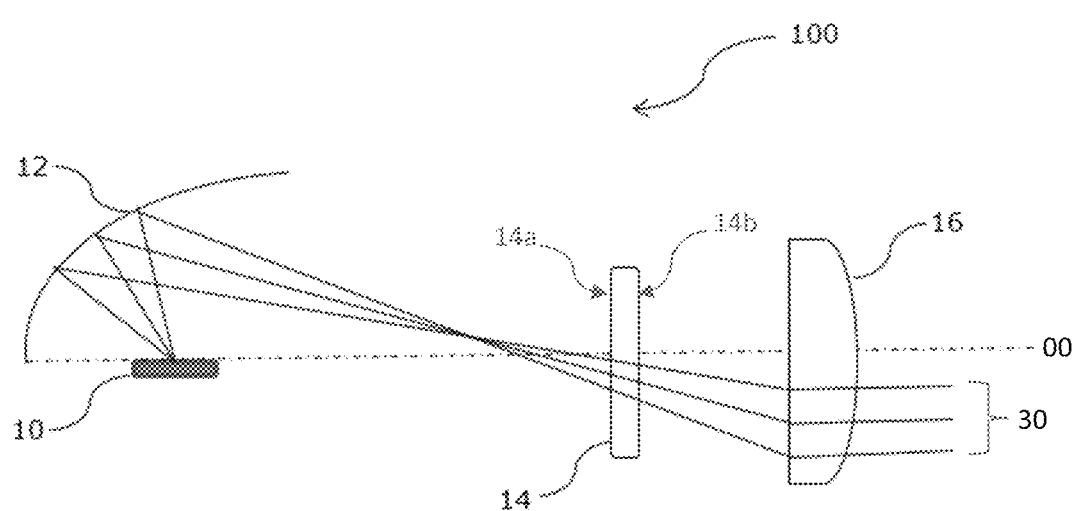
FIG. 1A shows an exemplary optical module of an automotive vehicle having at least a lens.

FIG. 1A shows an optical module of an automotive vehicle having a lens. The figure shows a light source (10) for generating a light beam. The light beam generated by light source (10) is directed towards the outside of the optical module by reflector or directing medium (12) such as reflectors or in some cases light guides. The figure also shows a lens (14) which distributes the generated light beam from the light source (10) to meet photometry requirements. Lens (14) may be an inner lens system, as depicted.

Additionally, an outer lens (not shown) may also be provided in the optical module as arranged outside of a light-emissive medium 16 seen in the figure.

Figure 1B:
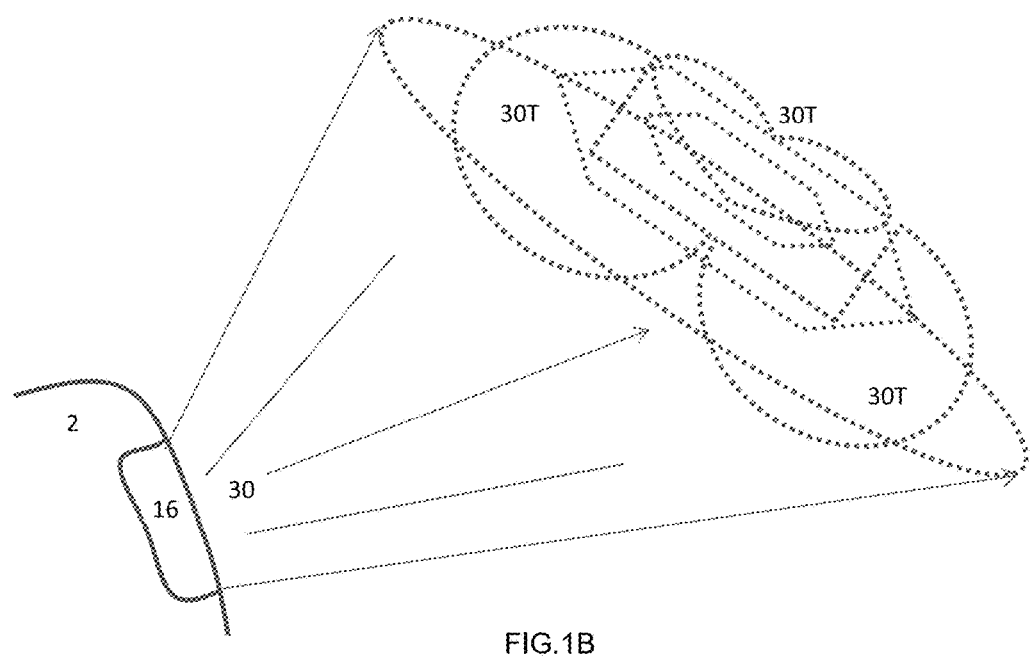
FIG. 1B illustrates a vehicle's exemplary optical module with applied optics to a lit area on a testing wall with a tilted or shifted beam pattern.

FIG. 1B illustrates a vehicle's 2 exemplary optical module with applied optics 20 to a lit area 30 on a testing wall with a tilted or shifted beam pattern 30T. An aspect illustration depicts how a generated light source 10 through applied optics 20 at lens portion 14a (without a corrective optics at 14b) creates a tilt or shifting effect 30T on a light beam image 30.

Figure 1C:
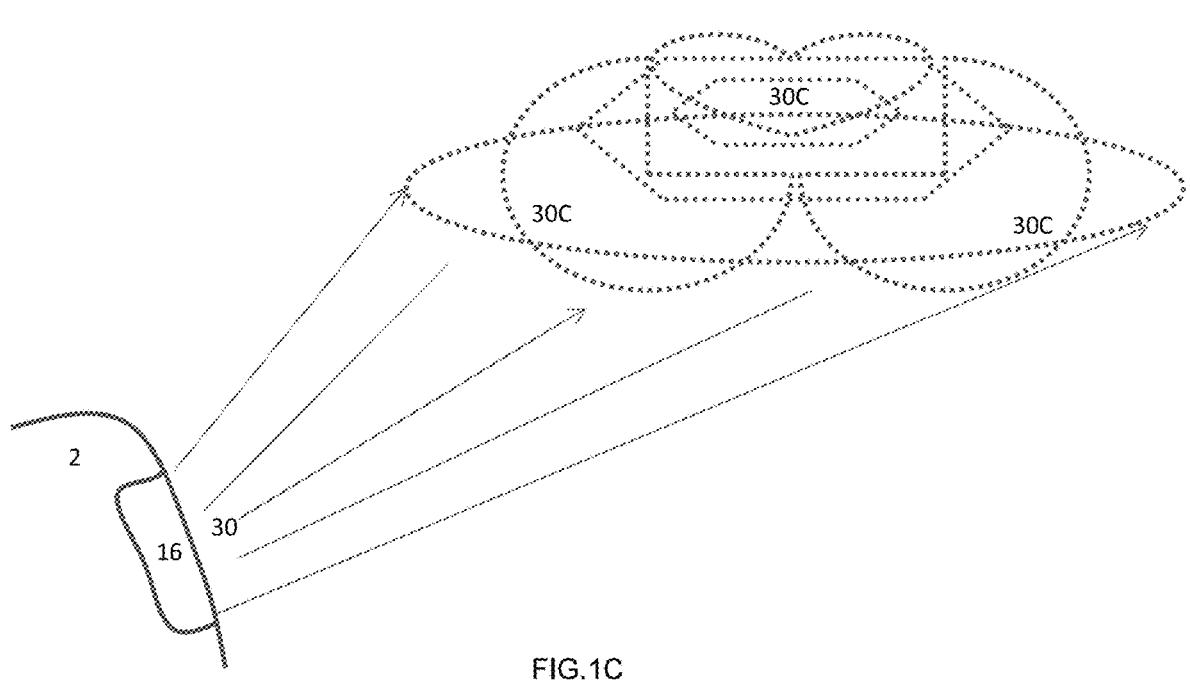
FIG. 1C illustrates a vehicle's optical module with the applied invention to a lit area on a testing wall that addresses pattern shift or tilt with a corrected beam pattern.

FIG. 1C illustrates a vehicle's 2 exemplary optical module with the applied invention 100 (that applies counterpart optics 20 at lens portions 14a,14b along intersecting baselines BL1,BL2 or VL depicted in figures) to a lit area 30 on a testing wall that resolves pattern shift or tilt and results in corrected beam pattern 30C.

Figure 2:
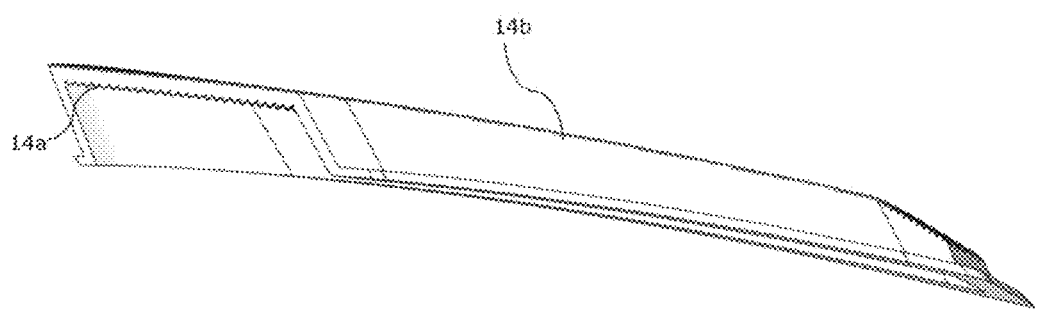
FIG. 2 is an isometric view of a lens of an optical module of and aspect of the present invention.
Figure 2A:
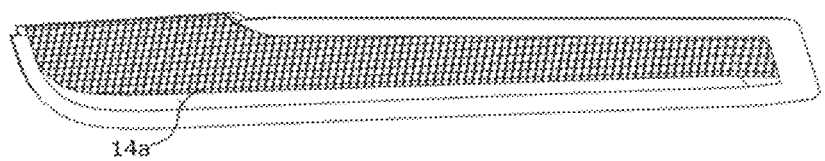
FIG. 2a shows the light output side of the lens of FIG. 2 as per the present invention. The figure further shows the light distribution facets on the light output side of the lens as per the embodiment of the present invention.
Figure 2B:
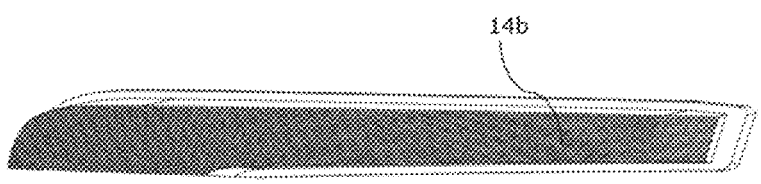
FIG. 2b shows the light input side of the lens of FIG. 2 as per the present inventive embodiment. The figure further shows light distribution facets on the light input side of the lens as per the present invention embodiment.
Figure 3:
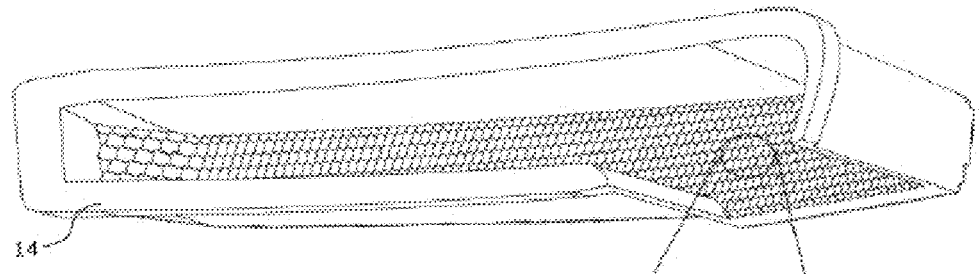
FIG. 3 shows one of the sides of the lens of FIG. 2 along with an aspect of optics structure of the light distribution facets.

FIG. 2 shows an isometric view of lens (14) associated to an exemplary optical module of the present invention. In FIGS. 2-3, two sides of the lens (14) can be seen. Lens (14) has a light input side (14a) and a light output side (14b). Lens (14) is provided with an optics pattern 20 such as on an inner lens portion 14a to create some unique patterns. The optical pattern is depicted in a form of light distribution facets (20). The sides (14a, 14b) comprise a plurality of the said light distribution facets (20). FIG. 2b shows the light distribution facets (20) on the light output side (14b) of the lens as per the embodiment of the present invention. These light distribution facets (20) are designed based on styling, lighting effects or for aesthetic purposes in the optical modules. The orientation of the pattern are sometimes tilted. That is, resultant patterns may not be oriented symmetrical along a horizontal or vertical axis—thus, creating a nonconforming or deviating pattern. Due to the tilted optical pattern of light distribution facets (20) on lens (14), the resultant light beam becomes inherently tilted. Therefore, the light beam image does not result symmetrical about the center point (referenced horizontal-vertical "HV" on a wall as defined by regulation).

Figure 4:
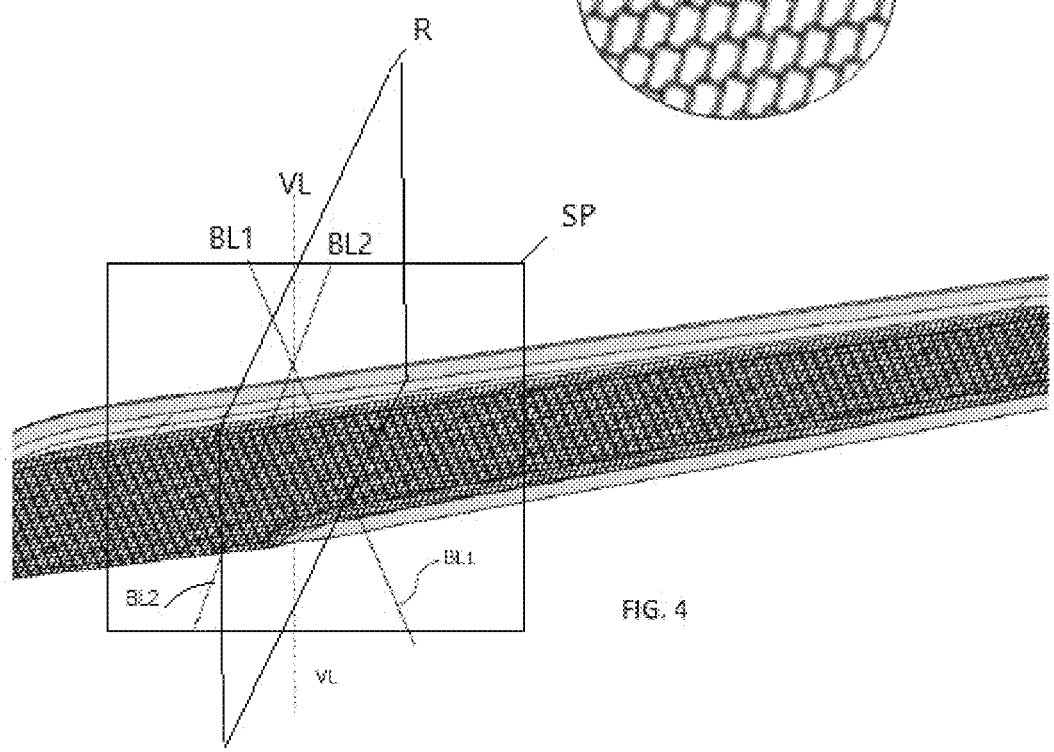
FIG. 4 also demonstrates an orientation in an aspect of the light distribution facets of the lens.
Figure 7:
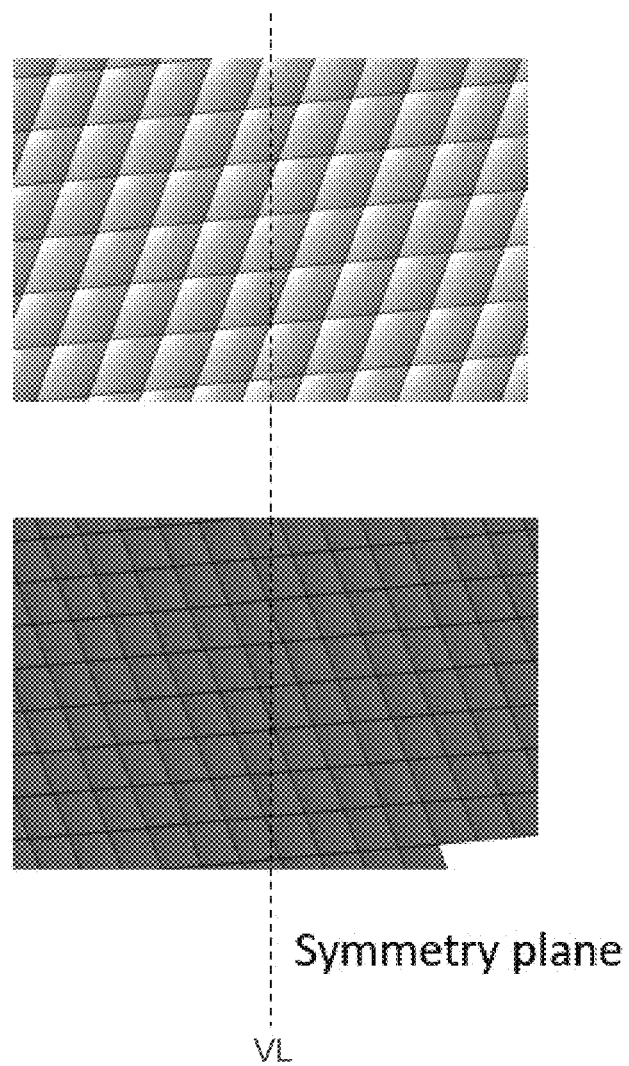
FIG. 7 shows the orientation of counterpart light distribution facets of the lens along a exemplary symmetry plane or reference axis as per the embodiment of the present invention.

To overcome and compensate resultant beam tilt, two segregate optical light distribution facet patterns on the lens (14) are provided with a symmetrical orientation (symmetric relative to vertical line "VL" depicted by FIG. 4). FIGS. 2-4 show one such arrangement as per the present invention where light distribution facets (20) on the light input side (14a) of the lens (14) as per a present invention embodiment. In this aspect, the orientation of the plurality of light distribution facets (20) on the light input side (14a) are different from an orientation of the plurality of light distribution facets (20) on the light output side (14b). As can be seen, FIG. 7 shows the counterpart orientation of light distribution facets (20) on the light input side (14a) and light output side (14b) respectively of lens (14). The orientation is symmetric or mirrors along the symmetry plane or reference axis (along VL). As an alternative design aspect, it is conceivable that an initiating tilt pattern and corrective counterpart pattern 20 may reverse roles or be interchangeable between 14b and 14a lens portions.

FIG. 3 shows one of the lens (14) sides in FIGS. 2-2b along with one aspect structure of light distribution facets (20). Light distribution facets (20) can be seen within the figures and are provided to demonstrate an optical pattern and light distribution among possible embodiments of the current invention.

As shown in FIG. 4, a first set of a plurality of the light distribution facets (20) are oriented to create an associated baseline reference BL1. Baseline reference BL1 is created along an associated pattern orientation of the light distribution facets (20). A second set of a plurality of the light distribution facets (20) are oriented to create an associated baseline reference BL2. Baseline reference BL2 is also created along an associated pattern orientation of distinguished light distribution facets (20). Furthermore, each segregate baseline (BL1,BL2) of each plurality of the light distribution facets (20) is aligned at an inclination with vertical axis line (VL) of the light beam. Baseline (BL1) of the plurality of light distribution facets (20) on the light input side (14a) and baseline (BL2) of the plurality of light distribution facets (20) on the light output side (14b) intersect to form a point of symmetry or mirror axis reference.

Figure 5A:
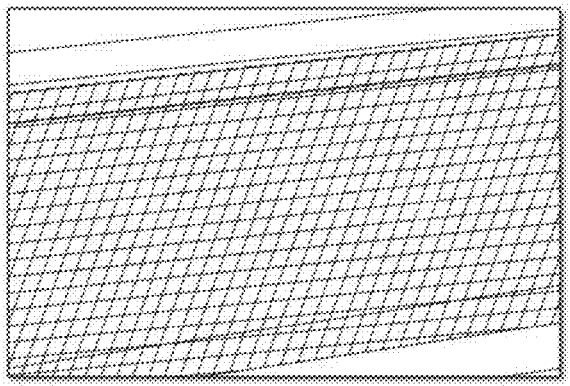
FIG. 5a shows an orientation aspect of the light distribution facets on one side of the lens.
Figure 5B:
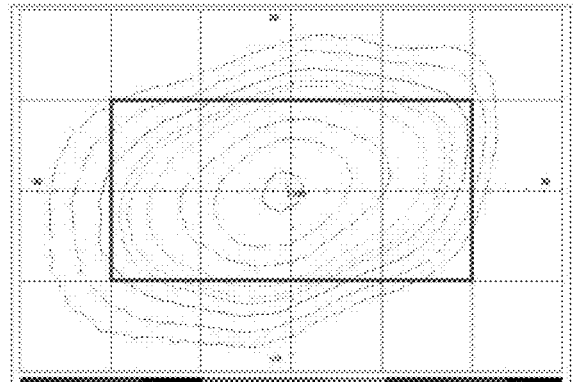
Figure 6A:
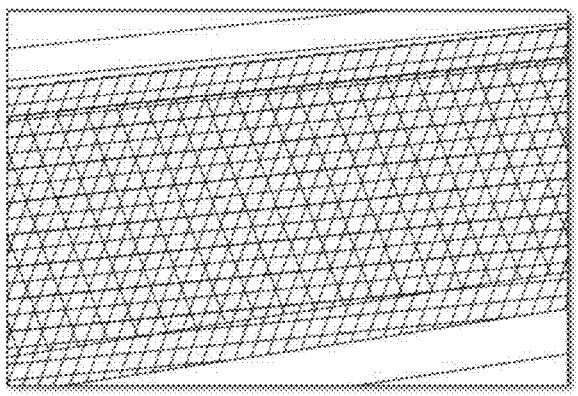
FIG. 6a shows an orientation aspect of the light distribution facets on both sides of the lens as per the embodiment of the present invention.
Figure 6B:
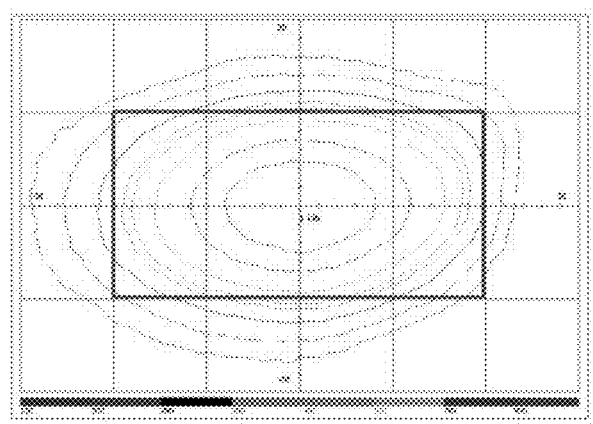

FIG. 5a shows a light distribution facets (20) aspect orientation on one of the lens (14) sides. Corresponding FIG. 5b, shows the photometry or resultant beam formed through the lens application of FIG. 5a. The depicted resultant beam can be seen tilted towards one side in a tilted state, which prompts a need of the invention. FIG. 6a, shows the applied lens aspect of the present invention (counterpart facet orientation applied on both lens 14 sides) and FIG. 6b shows the corresponding photometry or beam output. As seen between figures, the plurality of the light distribution facets (20) on the light input side and the plurality light distribution facets on the light output side phase interface and are symmetrical to each other such that the lens creates a light beam pattern symmetric about the center point of light beam axis. As may be seen, light distribution facets (20) on the lens light input side (14a) are created in a way to counter the beam tilt caused by the light distribution facets (20) of the light output side (14b) of lens (14). Due to the depicted example arrangement, beam output (30) of the optical module is symmetrical and centered on HV point (horizontal-vertical center point) and is able to achieve regulation grid or qualify regulatory compliance.

It should be appreciated that the above referenced aspects and examples are non-limiting, as others exist within the present invention as shown and described herein. Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

Light Source 10

Light source 10 represents a visually perceived source of electromagnetic radiation or an energized source of visually perceived radiant energy (inclusive of "Visible" light within the electromagnetic spectrum) but may include a broad combination or range of electromagnetic or radiant energy inclusive from among X-rays, ultraviolet and infrared energy, micro-wave and radio-wave spectrums. The light source may include every conventional and suitable lighting element sources such as filament-based or incandescent lamps, fluorescent lamps, arc or gas-discharge type lights, light emitting diodes (LED), or other suitable conventional sources.

Optical Axis 00

Optical axis 00 functions as a reference axis line that defines the principal light path along which light propagates through an optical system 100 along which there is some degree of rotational symmetry.

Light Emission Axis 1

Light emission axis 1 functions as a reference axis line that defines the principal light path from a single point light source towards the target point direction along which the light propagates.

Reflector-Directing Medium 12

Reflector 12 functions as an object for reflecting light in a required direction and may use such an object's reflective surface(s) to redirect light towards a particular spot, location, randomized direction or a focused target area.

Light-Emissive Medium 16

Light-emissive medium 16 functions as the material body that a light wave (inclusive of electromagnetic particle or varying-spectrum light waves) passes through. For example, light waves traveling through or passing-through a "medium" material. Light-emissive medium may be constructed or formed from a unitized, integral or from a combination of constituent body components. Light-emissive medium material may include rigid bodies or a material body of varying flexibility or a material body of relative elasticity or a gel-rubberized material. Light-emissive medium may be formed from a simple geometric or customized shape and may include various colorant or additive features which may interfere with light transmission at various levels yet still allow for light transmission through the "medium" body at various degrees.

Lens 14

Lens 14 functions as a piece of glass, polymeric, transparent material, or other light-emissive or light-transmissive body with curved sides for concentrating or dispersing light rays, used singly (as in a magnifying glass) or with other lenses (as in a telescope). The lens may include material additive features, optical features at portions of its body or throughout its body or at various locations along its body to effect the light transmission characteristics through the lens. Term "inner lens" may intend to mean any lens situated behind at least an "outer lens," and accordingly, the term "outer lens" may intend to mean any lens situated in front of at least an "inner lens."

Light Input-Output Sides 14a, 14b

A light input side 14a or light output side 14b functions as a directional reference surface, curvilinear side, linear side or datum marker from which light enters or exits a light-emissive medium 16 or other reflective or refractive body.

Light Distribution Facets & Optics 20

Light distribution facets or optics 20 function as an arrangement-series of flat faces or geometric form(s) on a body 12 along a light reflecting surface and may include a formed cut, protrusion, impression, formed pattern of a particular form, formations with numerous facets so as to provide a particular optical effect(s) upon having contact with light—either by light striking, penetrating or via reflection through the produced form or geometric formation(s). Optics or light distribution facets may conform to a grid pattern, horizontal-vertical pattern arrangement or tailored-randomized array arrangement. The light distribution facets may conform to/with geometric shapes inclusive of . . . simple geometric triangle, square, diamond, quadrilateral, polygonal, spherical, dome or beaded, dimpled, conical, concave, convex, pillow, fish-scale or such similar forms or other customized forms. The term "optics" may further intend to convey the patterns formed on a surface of a lens 14 or light-emissive medium 16. Scaling features associated with light distribution facets 20 may also incorporate scaling factors of up to ×2 either by reduction or magnification between Light Input-Output Sides 14a, 14b where optics 20 are formed without significant degradation to beam image patterns consistent with experimental findings and results.

Baseline Reference BL1, BL2

Baseline BL1 functions as the benchmark reference for a first applied optics pattern 20 that forms a basis for counter-acting or counterpart light distribution facets and formulation of establishing Symmetry plane-Reference axis VL.

Baseline BL2 functions as the benchmark reference for a second applied optics pattern 20 that is distinguished from first applied optics pattern 20. Baseline BL2 is derived from the counter-acting or counterpart light distribution facets relative to Symmetry plane-Reference axis VL.

Symmetry Plane-Reference Axis VL

Symmetry plane-Reference axis VL functions as a resulting reference axis formed from the intersection of baselines BL1, BL2, which helps establish a mirror-image or symmetry reference guide to enable a determination of counter-acting optics 20.

Beam Pattern-Beam Output 30

Beam Pattern 30 functions as a light ray collection or energized stream of light particles, which result in a light output image or pattern of light.

Tilted Beam Pattern 30T

Tilted Beam Pattern 30T functions to represent a shifted, tilted or skewed beam image of a light beam pattern 30 transmitted through a first applied optics pattern 20 at lens 14 or light-emissive medium 16. As depicted by example in FIG. 1B, light beam 30 through a first applied optics pattern 20 shifts or skews beam pattern 30 to render an image beam that appears tilted 30T (as compared to being transmitted through a light-emissive medium 14 or 16 that does not shift, skew or tilt a light output image without optics).

Corrected Pattern 30C

Corrected Pattern 30C functions to re-shape a shifted beam image from the 30T condition. The corrected pattern serves to re-shape a light beam pattern of an effectively shifted image pattern 30T or previously altered image by optics 20.

A corrective optics pattern is meant to convey the neutralized, counter-acted or corrective effect of applied optics on a beam pattern or beam output image 30T. Another way towards helping understand the invention is to view that corrected pattern 30C is the rectified photometry of a shifted photometry 30T.

Corrective optics 20 is applied symmetric (symmetric relative to VL) when overlaid over initially applied optics 20 to result in an unaltered beam image—a beam pattern 30 image that is symmetric about the horizontal-vertical axes as if no altering optics was applied. In other words, corrective optics 20 may be considered the neutralization of initially applied optics 20's effect on a beam image—the neutralization against beam "tilt" or the feature promoting image shifting correction.

Corrected pattern 30C may be implemented through super-imposed counter-acting optical features that reshape an altered, tilted or mis-aligned light beam image 30T. 30C is liken to an un-altered beam pattern 30 that aligns horizontally and vertically symmetric with each respective horizontal-vertical axis.

Although the present disclosure provides references to figures, all embodiments shown in the figures are intended to explain preferred embodiments of the present invention by way of example rather than being intended to limit the present invention. Preferred embodiments of the present invention have been disclosed. However, it should be apparent to a person of ordinary skill in the art that certain modifications would come within the teachings of this invention and that various changes or modifications may be made in the present disclosure without departing from the principles and spirit of the disclosure, which are intended to be covered by the present invention as long as these changes or modifications fall within the scope defined in the claims and their equivalents.

LIST OF ELEMENT NUMBERS

Optical Axis 00
Light Emission Axis 1
Automobile-Vehicle 2
Light source 10
Directing Medium or Reflector 12
Lens 14
Light Input Side 14a
Light Output Side 14b
Light-emissive medium 16
Light Distribution Facets-Optics 20
Beam Pattern-Beam Output 30
Tilted Beam Pattern 30T
Corrected Beam Pattern 30C
Baseline BL1
Baseline BL2
Vertical Line-Intersection Reference VL

What is claimed is:

1. An optical module for an automobile comprising:
an optical axis of said optical module that functions as an optical reference;
a horizontal axis that is perpendicular to the optical reference;
a vertical axis that is perpendicular to the optical reference, where an intersection of the optical reference and vertical axis forms a reference plane (R);
a light source to generate a light beam;
a directing medium for directing the generated light beam from the light source; and
a lens to distribute the light beam directed from the directing medium,
wherein the lens comprises a light input side and a light output side, where each of said input and output sides comprise a plurality of light distribution facets oriented along the horizontal axis and the vertical axis relative to the reference plane (R), and wherein an orientation of the plurality of light distribution facets along a light incident surface at the light input side is different from an orientation of the plurality of light distribution facets along a light exit surface at the light output side;
wherein the plurality of the light distribution facets at the light input side are configured to form a baseline reference BL1 that is at an inclination with a reference axis VL aligned within the reference plane (R) of the optical module,
the reference BL1 of the plurality of light distribution facets from the light input side and the baseline reference BL2 of the plurality of light distribution facets from the light output side intersect within a symmetry plane (SP) that is orthogonal to the reference plane (R),
and the plurality of the light distribution facets at the light output side are configured to form a baseline reference BL2, wherein the baseline reference BL2 is at an opposing but symmetric inclination with reference axis VL located within the symmetry plane.

2. The optical module of claim 1, wherein the plurality of the light distribution facets on the light incident surface and the plurality light distribution facets on the light exit surface have a symmetrical orientation with respect to the reference plane (R).

3. The optical module of claim 1, wherein the lens represents an inner lens of the optical module.

4. The optical module of claim 1, wherein the directing medium is a reflector unit for reflecting the light beam generated from the light source towards the distribution system.

5. The optical module of claim 1, wherein the directing medium is a light guide system for directing the light beam generated from the light source towards the distribution system.

6. The optical module of claim 1, wherein the lens creates a light beam pattern symmetric about a center point of a horizontal-vertical light beam axis (HV) of a regulatory wall that said beam pattern is imaged onto.

7. The optical module of claim 1, wherein a resultant photometry or a resultant beam formed through the lens application of said optical module is configured to correct beam tilt and qualify regulatory compliance.

8. A method of generating a symmetric beam pattern for an automobile optical module that comprises:
establishing an optical axis of said optical module that functions as an optical reference;
establishing a horizontal axis that is perpendicular to the optical reference;
establishing a vertical axis that is perpendicular to the optical reference, where an intersection of the optical reference and vertical axis forms a reference plane (R);
providing a light source to generate a light beam;
providing a directing medium to direct the light beam generated by the light source; and
providing a lens having a light input side and a light output side to distribute the light beam from the directing medium, wherein each of the said input and output sides comprise a plurality of light distribution facets on the lens oriented along the horizontal axis and the vertical axis relative to the reference plane (R)
wherein the plurality of the light distribution facets at the light input side are configured to form a baseline reference BL1 that is at an inclination with a reference axis VL aligned within the reference plane (R) of the optical module,
the reference BL1 of the plurality of light distribution facets from the light input side and the baseline reference BL2 of the plurality of light distribution facets from the light output side intersect within a symmetry plane (SP) that is orthogonal to the reference plane (R), wherein the baseline reference BL2 is at an opposing but symmetric inclination with reference axis VL located within the symmetry plane.

9. The method of generating a symmetric beam pattern of claim 8, wherein an orientation of the plurality of light distribution facets along a light input side is different from an orientation of the plurality of light distribution facets along a light output side.

* * * * *